(12) United States Patent
Chang (10) Patent No.: US 8,159,633 B2
(45) Date of Patent: Apr. 17, 2012

(54) OPTICAL PLATE AND LIQUID CRYSTAL DISPLAY DEVICE USING THE SAME

(75) Inventor: Shao-Han Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 592 days.

(21) Appl. No.: 11/933,437

(22) Filed: Nov. 1, 2007

(65) Prior Publication Data

US 2009/0040424 A1 Feb. 12, 2009

(30) Foreign Application Priority Data

Aug. 6, 2007 (CN) .......................... 2007 1 0201289

(51) Int. Cl.
*G02F 1/1335* (2006.01)
(52) U.S. Cl. ........................................................ 349/64
(58) Field of Classification Search ........................ None
See application file for complete search history.

(56) References Cited

U.S. PATENT DOCUMENTS

| 5,552,907 | A | * | 9/1996 | Yokota et al. | ............ 349/62 |
| 5,779,338 | A | * | 7/1998 | Ishikawa et al. | ............ 362/625 |
| 6,261,664 | B1 | * | 7/2001 | Beeson et al. | ............ 428/141 |
| 6,752,505 | B2 | * | 6/2004 | Parker et al. | ............ 362/627 |
| 6,870,674 | B2 | | 3/2005 | Ookawa et al. | |
| 2007/0014034 | A1 | * | 1/2007 | Lee et al. | ............ 359/707 |
| 2007/0086179 | A1 | | 4/2007 | Chen et al. | |
| 2007/0115569 | A1 | | 5/2007 | Tang et al. | |

FOREIGN PATENT DOCUMENTS

| JP | 2003-337331 A | 11/2003 |
| TW | 200702835 | 1/2007 |
| TW | 200719056 | 5/2007 |

* cited by examiner

*Primary Examiner* — Lucy Chien
(74) *Attorney, Agent, or Firm* — Altis Law Group, Inc.

(57) ABSTRACT

An exemplary optical plate includes a transparent layer and a light diffusion layer. The transparent layer and the light diffusion layer are integrally formed. The transparent layer includes a light input interface, a light output surface opposite to the light input interface, and a plurality of curved, elongated, V-shaped micro-protrusions are formed on the light output surface. The light diffusion layer is located adjacent to the light input interface of the transparent layer. A plurality of V-shaped micro-protrusions are formed on an outer surface of the light diffusion layer. A liquid crystal display device using the optical plate is also provided.

16 Claims, 8 Drawing Sheets

OPTICAL PLATE AND LIQUID CRYSTAL DISPLAY DEVICE USING THE SAME

CROSS-REFERENCE TO RELATED APPLICATIONS

This application is related to three co-pending U.S. Patent Applications, which are: application Ser. No. 11/875,958, Ser. No. 11/875,959, filed on Oct. 22, 2007, and entitled "TWO-LAYERED OPTICAL PLATE", application Ser. No. 11/944,440, and entitled "TWO-LAYERED OPTICAL PLATE". In all the co-pending applications, the inventor is Shao-Han Chang. All of the co-pending applications have the same assignee as the present application. The disclosures of the above identified applications are incorporated herein by reference.

BACKGROUND OF THE INVENTION

1. Field of the Invention

The present invention generally relates to optical plates, and more particularly to an optical plate for use in, for example, a liquid crystal display (LCD).

2. Discussion of the Related Art

Figure 7:
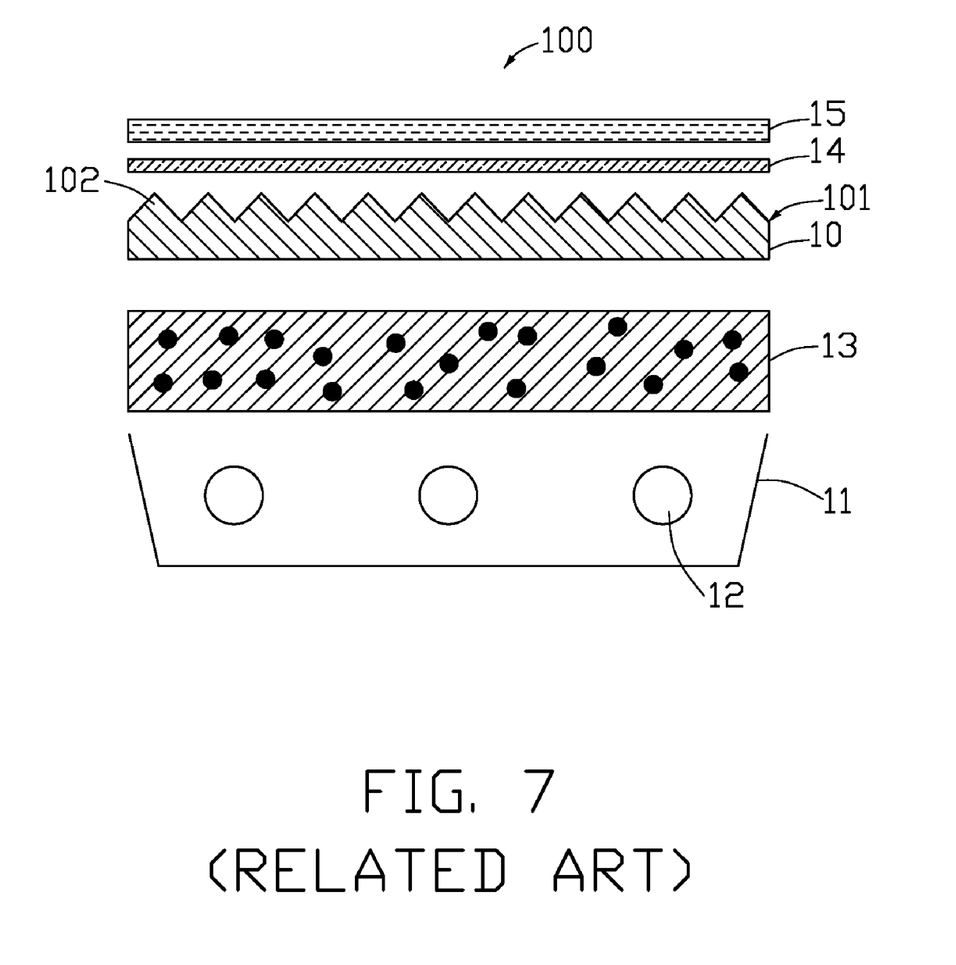
FIG. 7 is an exploded, side cross-sectional view of a conventional liquid crystal display device having a prism sheet.

FIG. 7 is an exploded, side cross-sectional view of a typical liquid crystal display device 100 employing a typical prism sheet 10. The liquid crystal display device 100 includes a housing 11 and a plurality of lamps 12 disposed in the housing 11. The liquid crystal display device 100 further includes a light diffusion plate 13, a prism sheet 10, an upper light diffusion film 14 and a LCD panel 15 stacked on the housing 11 in that order. The lamps 12 emit light, and inner walls of the housing 11 are configured for reflecting light upwards. The light diffusion plate 13 includes a plurality of embedded light dispersion particles. The dispersion particles are configured for scattering light, thus enhancing the uniformity of light exiting the light diffusion plate 13.

Figure 8:
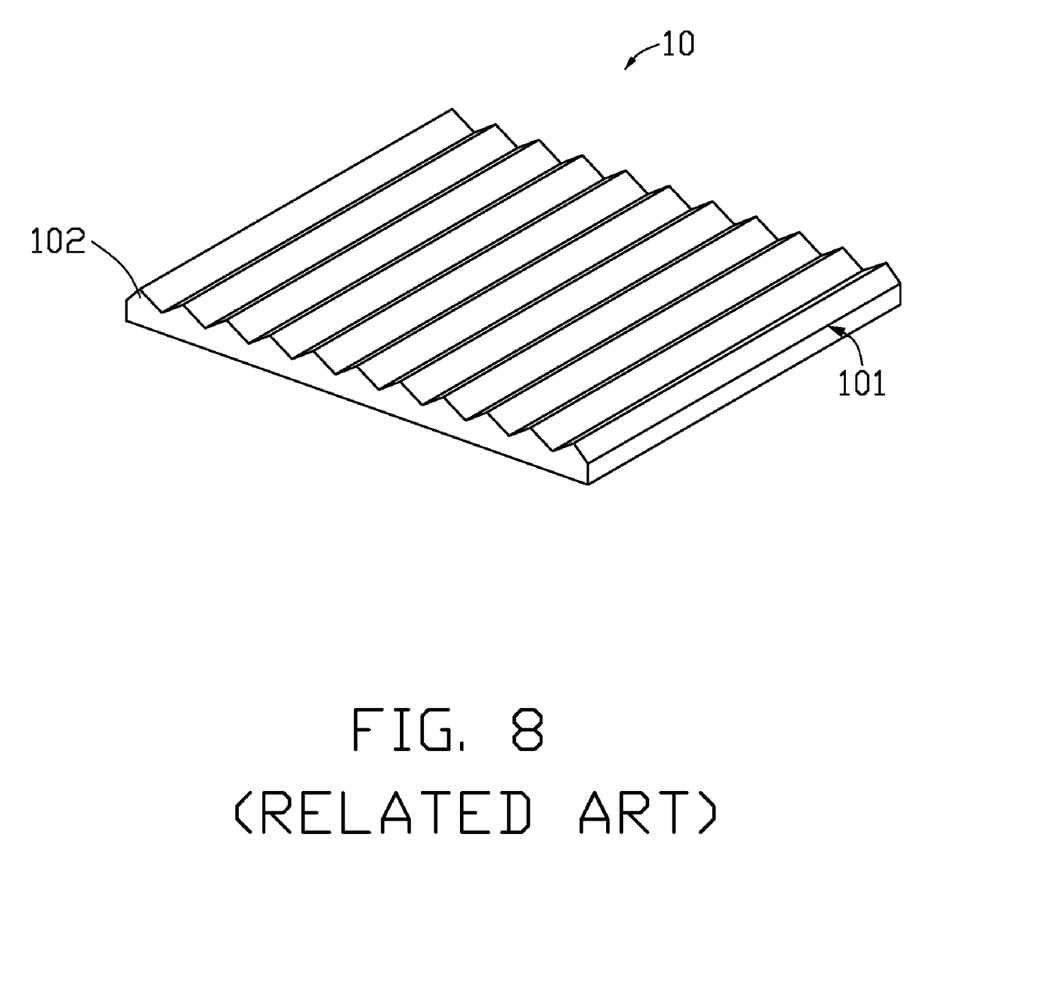
FIG. 8 is an isometric view of the prism sheet of FIG. 7.

Referring to FIG. 8, the prism sheet 10 includes a plurality of V-shaped structures 102 on a top surface 101. The V-shaped structure 102 extends along a straight line from one end to another end of the prism sheet 10. A plurality of V-shaped structures 102 are regularly and periodically arranged parallel to each other. The V-shaped structures 102 are configured for collimating light to a certain extent.

In use, light from the lamps 12 enters the light diffusion plate 13 and becomes scattered. Thus, scattered light leaves the light diffusion plate to the prism sheet. The scattered light then travels through the prism sheet before being refracted out at the prism lenses of the prism sheet. Thus, refracted light leaving the prism sheet is concentrated by the prism lenses and increases the brightness (increases illumination) of the prism sheet. The refracted light then propagates into an LCD panel (not shown) disposed above the prism sheet 10. However, moiré interference tends to occur on the LCD panel 15 because the V-shaped structures 102 are aligned similarly to the LCD pixels. In order to decrease the moiré interference, the liquid crystal display device 100 needs to add an upper light diffusion film 14 between the prism sheet 10 and the LCD panel 15. Although the upper light diffusion film 14 is disposed on the prism sheet 10, a plurality of air pockets still exists at the boundary between them. When the liquid crystal display device 100 is in use, light passes through the air pockets, and some of the light undergoes total reflection at one or another of the corresponding boundary. In addition, a great amount of light is absorbed by the upper light diffusion film 14. As a result, a light brightness of the liquid crystal display device 100 is reduced. Moreover, the diffusion plate 13 and the prism sheet 10 are made respectively, therefore air pockets at the boundary between them decreases an efficiency of light utilization.

What is needed, therefore, is a new optical plate and a liquid crystal display using the optical plate that can overcome the above-mentioned shortcomings.

SUMMARY

An optical plate according to a preferred embodiment includes a transparent layer and a light diffusion layer. The transparent layer and the light diffusion layer are integrally formed. The transparent layer includes a light input interface, a light output surface opposite to the light input interface, and a plurality of curved, elongated, V-shaped micro-protrusions are formed on the light output surface. The light diffusion layer is located adjacent to the light input interface of the transparent layer. A plurality of V-shaped micro-protrusions are formed on an outer surface of the light diffusion layer.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present optical plate. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present optical plate, in detail.

Figure 1:
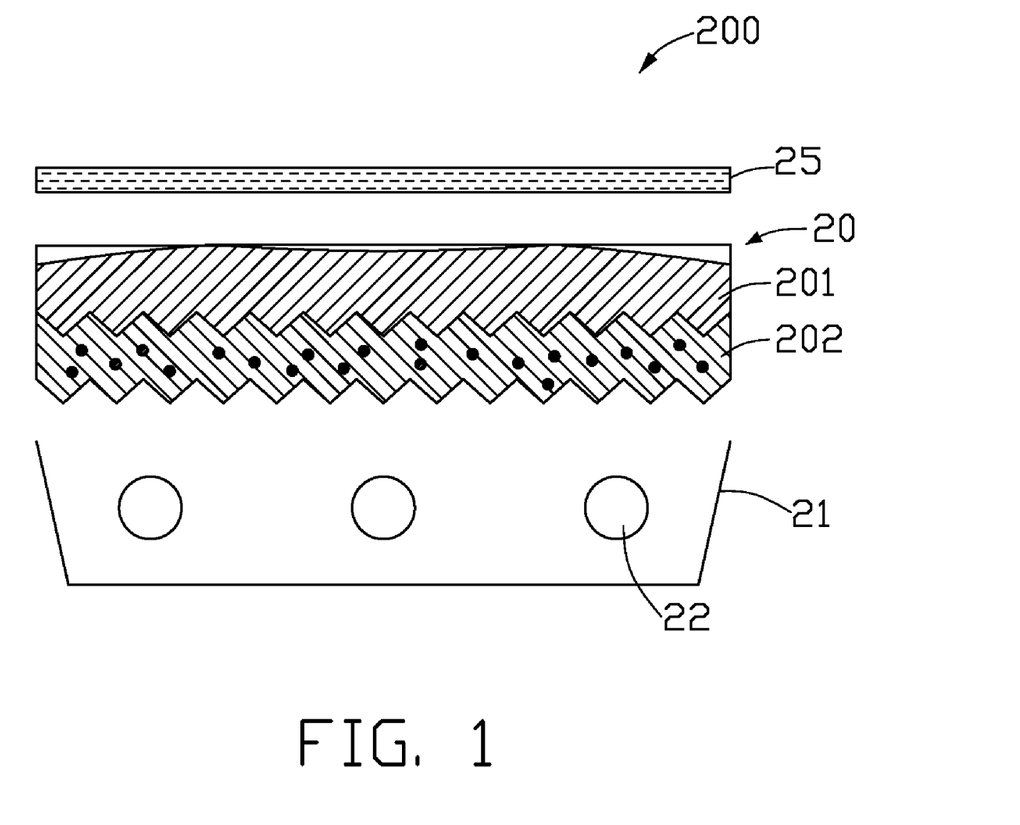
FIG. 1 is an exploded, side cross-sectional view of liquid crystal display device having an optical plate in accordance with a first embodiment of the present invention.

Referring to FIG. 1, a liquid crystal display device 200 of the present invention is shown. The liquid crystal display device 200 includes an optical plate 20, a housing 21, a plurality of lamps 22 and a LCD panel 25. A plurality of lamps 22 are disposed in the housing 21. The optical plate 20 is disposed above the lamps and the LCD panel 25 is stacked on the optical plate 20. The lamps 22 emit light, and inside walls of the housing 21 are configured for reflecting some of the light upwards. The housing 21 is made of metal or plastic materials with a high reflectivity rate. Alternatively, an interior of the housing 21 has a high reflectivity coating for improving light reflectivity rate. The lamps 22 can be point light sources or linear light sources, such as light emitting diodes and cold cathode fluorescent lamps.

Figure 2:
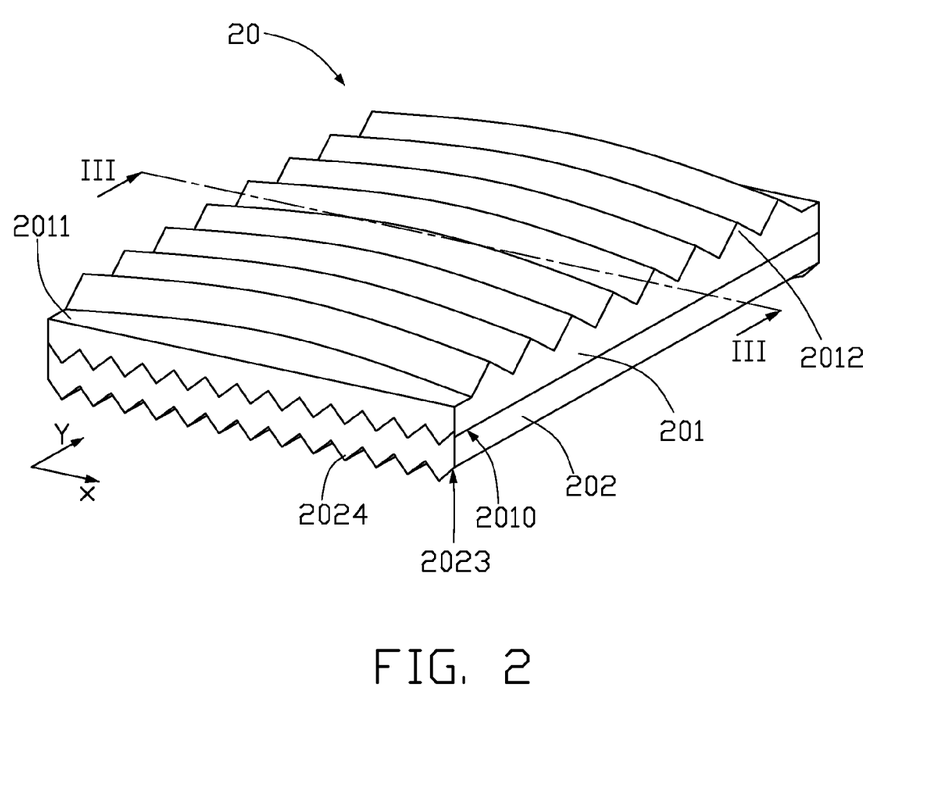
FIG. 2 is an isometric view of the optical plate of FIG. 1.
Figure 3:
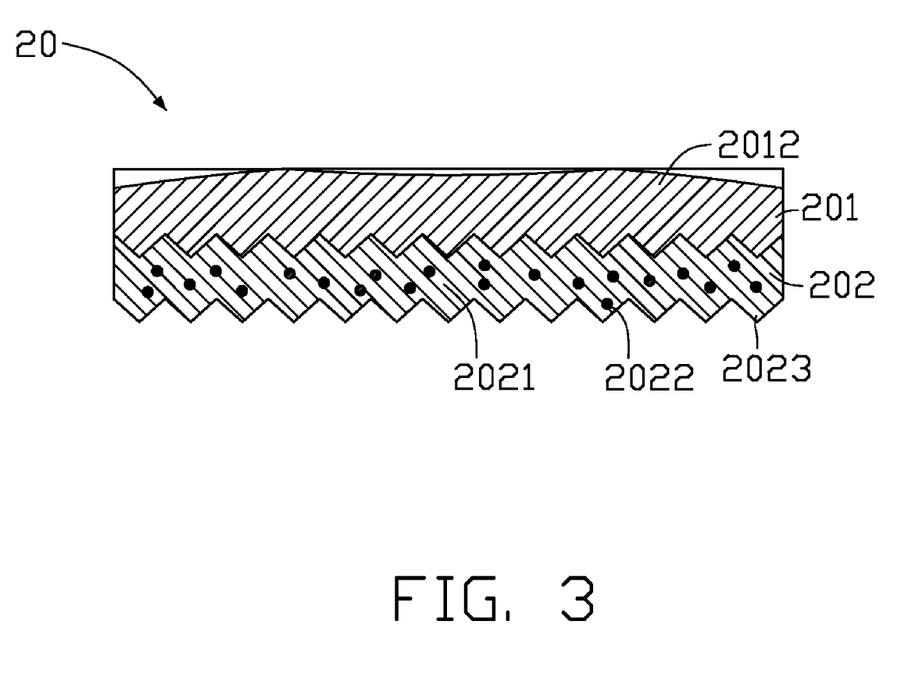
FIG. 3 is a side cross-sectional view of the optical plate of FIG. 2, taken along line III-III thereof.

Referring to FIGS. 2 and 3, the optical plate 20 includes a transparent layer 201 and a light diffusion layer 202. The transparent layer 201 and the light diffusion layer 202 are integrally formed by injection molding technology. That is, the transparent layer 201 and light diffusion layer 202 are in contact with each other at a common interface. The transparent layer 201 includes a light input interface 2010, a flat surface 2011 opposite to the light input interface 2010. A plurality of curved, elongated, V-shaped micro-protrusions 2012 are formed on the flat surface 2011. The light diffusion layer 202 is located adjacent to the light input interface 2010 of the transparent layer 201. A plurality of V-shaped micro-protrusions 2024 are formed on an outer surface 2023 of the light diffusion layer 202. A thickness of the transparent layer 201 and a thickness of the light diffusion layer 202 can both be equal to or larger than about 0.35 millimeters. In the first embodiment, a value of the combined thickness of the transparent layer 201 and the light diffusion layer 202 is preferably in the range from about 1 millimeter to about 6 millimeters. The optical plate 20 is above the lamps 22, and the light diffusion layer 202 of the optical plate 20 is adjacent to the lamps 22.

Figure 4:
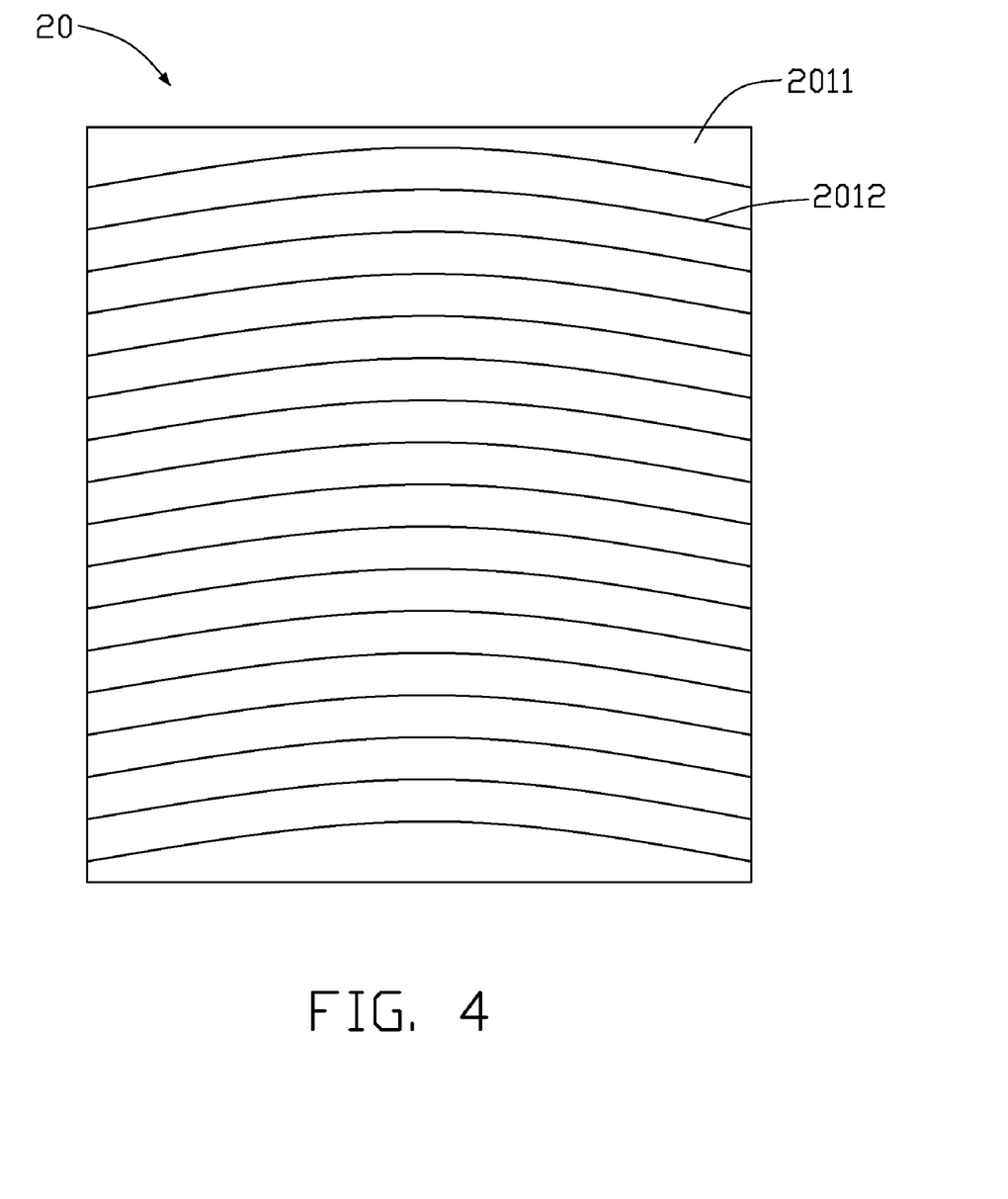
FIG. 4 is a top plan view of the optical plate shown in FIG. 2.

A plurality of the curved, elongated, V-shaped micro-protrusions 2012 are formed on the flat surface 2011 of the optical plate 20 side by side. Referring to FIG. 4, edges of each curved, elongated, V-shaped micro-protrusion 2012 extend along predetermined arcs from one end to the other end of the optical plate 20. The predetermined arcs have a same curvature. In the first embodiment, a pitch between adjacent curved, elongated, V-shaped micro-protrusions 2012 is configured to be in a range from about 0.025 millimeters to about 1 millimeter. A vertex angle of each of the curved, elongated, V-shaped protrusions 2012 is in a range from about 60 degrees to about 120 degrees.

Figure 5:
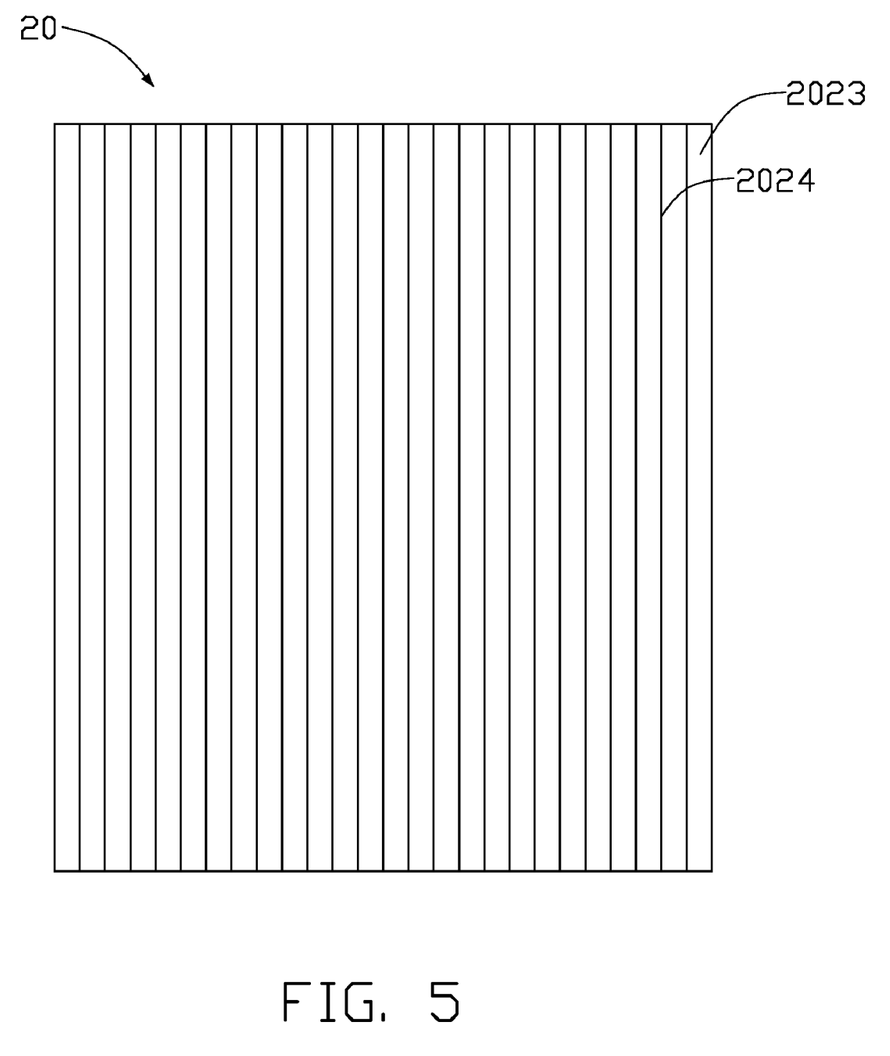
FIG. 5 is a bottom plan view of the optical plate shown in FIG. 2.

Referring to FIG. 5, a bottom plan view of the optical plate 20 is shown. A plurality of elongated V-shaped micro-protrusions 2024 are formed on an outer surface 2023 of the optical plate 20. Each V-shaped micro-protrusion 2024 extends along a straight line from one end to the other end of the light diffusion layer 202. The V-shaped micro-protrusions 2024 are configured for receiving more light from the lamps 22.

The light diffusion layer 200 is configured for enhancing optical uniformity. The light diffusion layer 202 includes a transparent matrix resin 2021 and a plurality of diffusion particles 2022 dispersed in the transparent matrix resin 2021. The transparent matrix resin 2021 can be one or more materials selected from the group consisting of polyacrylic acid (PAA), polycarbonate (PC), polystyrene (PS), polymethyl methacrylate (PMMA), methylmethacrylate and styrene (MS), and any suitable combination thereof. The diffusion particles 2022 can be made of material(s) selected from the group consisting of titanium dioxide, silicon dioxide, acrylic resin, and any combination thereof. The diffusion particles 2022 are configured for scattering light and enhancing the light distribution capability of the light diffusion layer 202. The light from the lamps 22 can be substantially diffused in the light diffusion layer 202.

When the optical plate 20 is utilized in a typical liquid crystal display, light emitted from lamps 22 enters the light diffusion plate 202. The light is substantially diffused in the light diffusion layer 202. Subsequently, much or most of the light is condensed by the curved, elongated, V-shaped micro-protrusions 2012 of the transparent layer 201 after exiting the flat surface 2011. As a result, a brightness of the liquid crystal display device is increased. In addition, because the arrangement of the curved, elongated, V-shaped micro-protrusions 2012 are aligned obliquely with the LCD pixels either in the X-direction or the Y-direction, moiré interference between the optical plate 20 and the pixel pitch of LCD panel 25 can be decreased or even eliminated.

Furthermore, the transparent layer 201 and the light diffusion layer 202 are integrally formed together, with no air or gas pockets trapped between them. This increases an efficiency of light utilization. Moreover, when the optical plate 20 is utilized in the backlight module, it can replace the conventional combination of a diffusion plate and a prism sheet. Thereby, the assembly process of the backlight module is simplified. Moreover, the volume occupied by the optical plate 20 is generally less than that occupied by the combination of a diffusion plate and a prism sheet. Thus, the volume of the backlight module is reduced. Still further, the single optical plate 20 instead of the combination of two optical plates/sheets can reduce costs.

Figure 6:
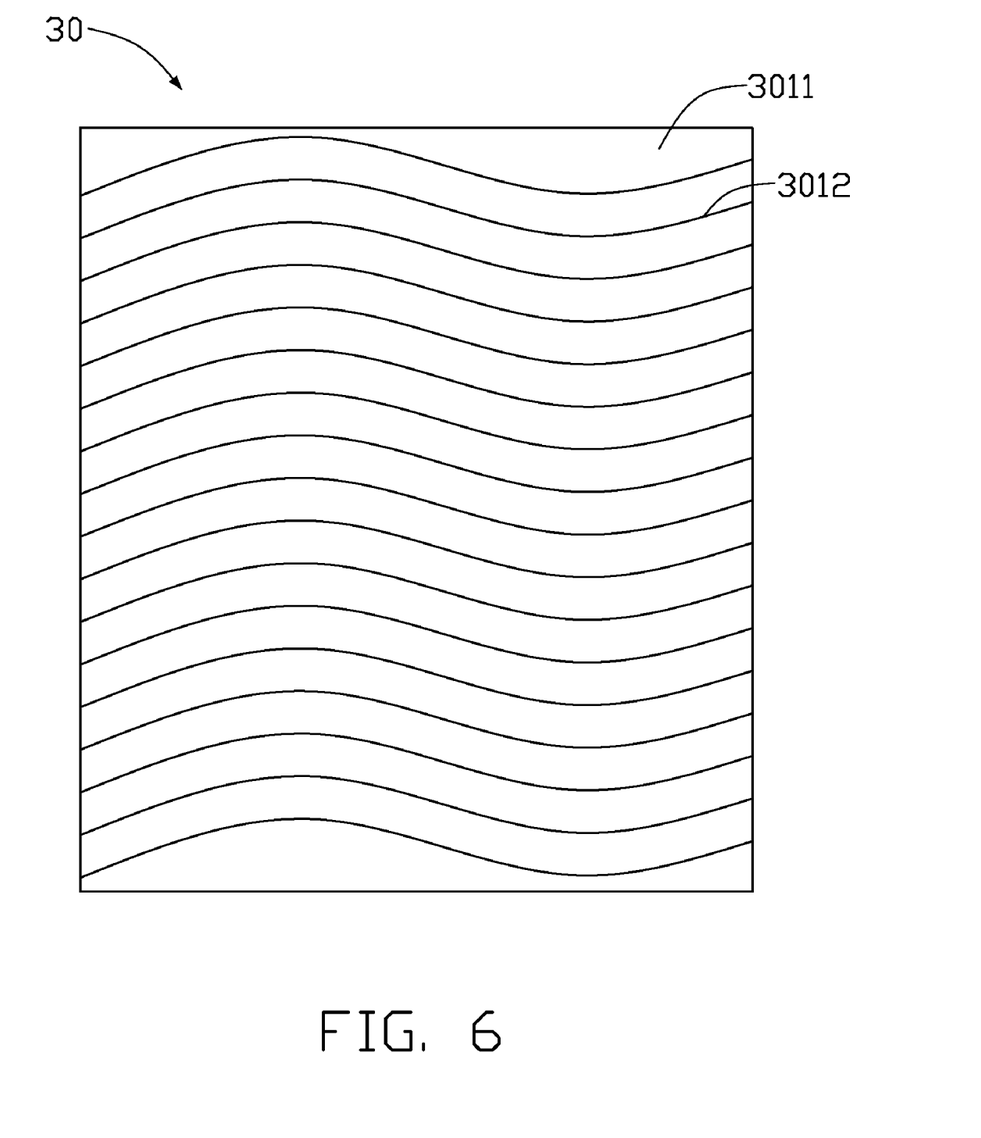
FIG. 6 is a top plan view of an optical plate in accordance with a second embodiment of the present invention.

Referring to FIG. 6, an optical plate 30 in accordance with a second preferred embodiment is shown. The optical plate 30 is similar in principle to the optical plate 20. However, each of the curved, elongated V-shaped micro-protrusions 3012 of a light output surface 3011 extends along a predetermined S-shaped curve.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical plate, comprising:
   a transparent layer comprising a light input interface, a flat surface opposite to the light input interface, and a plurality of curved, elongated, V-shaped micro-protrusions formed on the flat surface, wherein each of the curved, elongated, V-shaped micro-protrusions extends respectively along only one circular arc having a constant radius and two ends substantially adjacent to the opposite side surfaces of the optical plate viewed from a top aspect of the curved, elongated, V-shaped micro-protrusions and opposite to the flat surface, each of the V-shaped micro-protrusions are the same, and the only one circular arc defined in the flat surface: and
   a light diffusion layer integrally formed in contact with the light input interlace of the transparent layer, and free of air or gas pockets trapped in an interface therebetween, wherein the light diffusion layer comprises a transparent matrix resin and a plurality of diffusion particles dispersed in the transparent matrix resin, and a plurality of V-shaped micro-protrusions formed on an outer surface thereof.

2. The optical plate as claimed in claim 1, wherein the curved, elongated, V-shaped micro-protrusions extend along a same direction.

3. The optical plate as claimed in claim 1, wherein a vertex angle of each of the curved, elongated, V-shaped protrusions is in a range from about 60 degrees to about 120 degrees.

4. The optical plate as claimed in claim 1, wherein a pitch between adjacent curved, elongated, V-shaped protrusions is in a range from about 0.025 millimeters to about 1 millimeter.

5. The optical plate as claimed in claim 1, wherein the transparent matrix resin is selected from one or more materials consisting of polyacrylic acid, polycarbonate, polystyrene, polymethyl methacrylate, methylmethacrylate and styrene, and any combination thereof.

6. The optical plate as claimed in claim 1, wherein the diffusion particles are made of one or more materials selected from the group consisting of titanium dioxide, silicon dioxide, acrylic resin, and any combination thereof.

7. A liquid crystal display device comprising:
a light source;
an optical plate disposed above the light source, the optical plate comprising:
  a transparent layer comprising a light input interface, a flat surface opposite to the light input interface, and a plurality of curved, elongated, V-shaped micro-protrusions formed on the flat surface, wherein each of the curved, elongated, V-shaped micro-protrusions respectively extend along only one circular arc having a constant radius and two ends substantially adjacent to the opposite side surfaces of the optical plate viewed from a top aspect of the curved, elongated, V-shaped micro-protrusions and opposite to the flat surface, each of the V-shaped micro-protrusions are the same, and the only one circular arc defined in the flat surface; and
  a light diffusion layer integrally formed in contact with the light input interface of the transparent layer, and free of air or gas pockets trapped in an interface therebetween, wherein the light diffusion layer comprises a transparent matrix resin and a plurality of diffusion particles dispersed in the transparent matrix resin, and a plurality of V-shaped micro-protrusions formed on an outer surface thereof; and
a liquid crystal display panel disposed above the optical plate.

8. The liquid crystal display device as claimed in claim 7, wherein the light source is one of a point light source and a linear light source.

9. The liquid crystal display device as claimed in claim 7, wherein the curved, elongated, V-shaped micro-protrusions extend along a same direction.

10. The liquid crystal display device as claimed in claim 7, wherein a vertex angle of each of the curved, elongated, V-shaped protrusions is in a range from about 60 degrees to about 120 degrees.

11. The liquid crystal display device as claimed in claim 7, wherein a pitch between adjacent curved, elongated, V-shaped protrusions is in a range from about 0.025 millimeters to about 1 millimeter.

12. The liquid crystal display device as claimed in claim 7, wherein the transparent matrix resin is selected from one or more materials consisting of polyacrylic acid, polycarbonate, polystyrene, polymethyl methacrylate, methylmethacrylate and styrene, and any combination thereof.

13. The liquid crystal display device as claimed in claim 7, wherein the diffusion particles are made of one or more materials selected from the group consisting of titanium dioxide, silicon dioxide, acrylic resin, and any combination thereof.

14. The optical plate as claimed in claim 1, wherein a plurality of V-shaped micro-protrusions formed on the light input interface, and have the same shape as the V-shaped micro-protrusions of the light diffusion layer.

15. The liquid crystal display device as claimed in claim 7, wherein a plurality of V-shaped micro-protrusions formed on the light input interface, and have the same shape as the V-shaped micro-protrusions of the light diffusion layer.

16. An optical plate, comprising:
  a transparent layer comprising a light input interface, a flat surface opposite to the light input interface, and a plurality of curved, elongated, V-shaped micro-protrusions formed on the flat surface; and
  a light diffusion layer integrally formed in contact with the light input interface of the transparent layer, and free of air or gas pockets trapped in an interface therebetween, wherein the light diffusion layer comprises a transparent matrix resin and a plurality of diffusion particles dispersed in the transparent matrix resin, and a plurality of V-shaped micro-protrusions formed on an outer surface thereof away from the transparent layer;
  wherein a plurality of V-shaped micro-protrusions formed on the light input interface have the same shape as the V-shaped micro-protrusions of the light diffusion layer.

\* \* \* \* \*